Oct. 27, 1931.                F. E. LOUDY                1,829,098
                        INVERTED STICK CONTROL
                          Filed Sept. 4, 1930
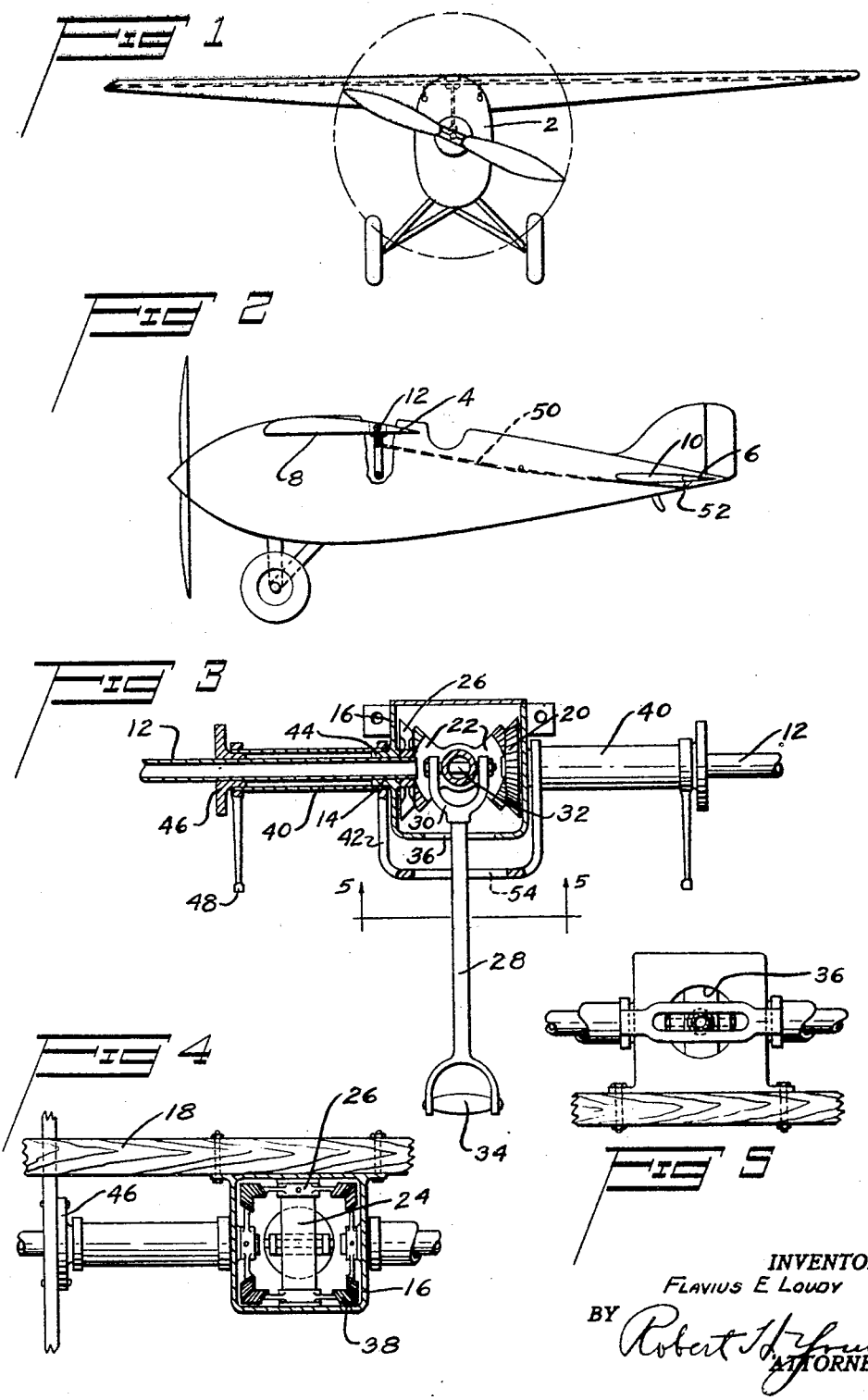
INVENTOR
Flavius E Loudy
BY Robert H. Young
ATTORNEY Patented Oct. 27, 1931

1,829,098

UNITED STATES PATENT OFFICE

FLAVIUS E. LOUDY, OF AKRON, OHIO

INVERTED STICK CONTROL

Application filed September 4, 1930. Serial No. 479,775.

This invention relates to aircraft, more particularly to the controlling means thereof, and is especially adapted to high wing monoplanes or biplanes having only upper wing ailerons.

This invention has for its object to provide a novel and improved controlling means, as will be pointed out in the detailed description appearing hereinbelow, and in order that the same may be better understood, reference is had to the accompanying drawings forming a part of this specification.

In the drawings:

Fig. 1 is a front elevational view of a monoplane embodying my invention;

Fig. 2 is a side elevation of Fig. 1, the fuselage of the airplane being broken away to show the manner of supporting control mechanism for lateral and longitudinal controllability of the airplane;

Fig. 3 is an enlarged fragmentary sectional view showing the mechanism for operating the control surfaces;

Fig. 4 is a fragmentary top plan view of Fig. 3 with parts removed; and

Fig. 5 is a fragmentary bottom plan view taken on 5—5 of Fig. 3.

Referring specifically to the drawings, 2 designates a conventional type airplane provided with ailerons 4 and elevators 6 that are actuated relative to the main supporting surfaces 8 and stabilizing surfaces 10 for obtaining respectively lateral and longitudinal stability and control.

The ailerons 4 are fixedly connected at the outer ends of two aligned rotatable torque tubes 12, the inner ends of which are mounted in spaced relation in bearings 14 formed in the walls of a gear housing 16, and the outer end portions of which are supported in bearings (not shown) fixed to the rear spar 18 of the supporting surfaces.

The gear housing 16 is disposed within the cockpit of the airplane and is preferably fixed to the spar 18 in any suitable manner, such as by bolts and nuts.

Each torque tube 12 carries at the inner end thereof a segmental gear 20 that is in mesh with a segmental gear 22 keyed to the jack shaft 24. This shaft is supported at its opposite ends in bearings 26 formed in the gear housing 16 and is rotated by means of a control stick 28, depending therefrom and connected thereto at one end by means of a yoke 30 and pin 32. The other end of the control stick is provided with a handle 34. The bottom wall of the gear housing is formed with a circular opening 36, through which the control stick passes and is of sufficient size to permit the maximum angular movement required thereof for actuating the ailerons to their extreme positions. An idler segmental gear 38 is also mounted on the jack shaft and moves freely relative thereto, but is in mesh with the segmental gears 20 for equalizing the gear teeth pressures. It will be seen that with the gear 22 in mesh with the gears 20 a lateral movement of the control stick will cause the gears 22 to be rotated in opposite directions and the ailerons 4 being operated thereby through the torque tubes 12 are likewise rotated in opposite directions relative to each other.

It is found desirable not to depart from the standard practice for obtaining lateral and longitudinal control by the use of a single lever and I have therefore provided a novel means of translating the longitudinal motion of the control stick to the elevators, as illustrated in Fig. 3. This novel means is in the nature of a crank shaft which consists of a pair of hollow shafts or tubes 40, that are telescoped over the inner ends of the torque tubes and are fixedly connected together for rotational movement about an axis coincident with the axis of said torque tubes by means of a depending crank arm or yoke 42, the legs of which are fixedly secured to the inner ends of the tube. An annular lateral projection 44 formed integral with the gear housing side walls and a collar 46 spaced therefrom and mounted on a suitable part of the fuselage serve as bearings for the ends of each tube 40.

The crank shaft is provided with a pair of levers 48 that are connected to push and pull rods 50 disposed on opposite sides of the fuselage. These rods are in turn connected to the elevator horns 52 for moving the elevators up and down. A slot 54 is provided in the yoke 42 through which the control stick passes and is of such dimensions as to permit only lateral movements of the control stick relative to the yoke. To and fro movements of the control stick will move the yoke therewith. It will thus be seen that for lateral control of the airplane, the control stick is relatively fixed with respect to the aileron gearing and relatively free with respect to the elevator mechanism and that for longitudinal control of the airplane the control stick by means of the pin connection with jack shaft 24 is relatively free with respect to the aileron gearing, but relatively fixed with respect to the elevator mechanism.

While I have shown and described my invention in considerable detail merely for purposes of exemplification, it will be understood that various changes and modifications in the combination and making of the parts may be made by those skilled in the art without departing from the spirit of my invention as hereinafter claimed.

Claim:

In an airplane having a main supporting surface and ailerons for the lateral control thereof spaced rods connected at their outer ends to said ailerons and being disposed longitudinally of said main surface, a gear box, gearing disposed within said gear box and interconnecting said rods, a shaft operatively connected to said gearing and rotatably mounted in said gear box and a manually operated control stick depending from said shaft and passing through an opening in the gear housing.

In testimony whereof I affix my signature.

FLAVIUS E. LOUDY.